United States Patent
Hinklin et al.

(10) Patent No.: US 7,870,640 B2
(45) Date of Patent: Jan. 18, 2011

(54) CONVERTIBLE BLOWER/VACUUM

(75) Inventors: Darrell W. Hinklin, Excelsior, MN (US); David J. Martin, Eden Prairie, MN (US)

(73) Assignee: The Toro Company, Bloomington, MN (US)

( * ) Notice: Subject to any disclaimer, the term of this patent is extended or adjusted under 35 U.S.C. 154(b) by 179 days.

(21) Appl. No.: 12/059,190

(22) Filed: Mar. 31, 2008

(65) Prior Publication Data

US 2009/0241285 A1  Oct. 1, 2009

(51) Int. Cl.
 *A47L 5/00* (2006.01)
 *A47L 9/00* (2006.01)

(52) U.S. Cl. ........................................ 15/330
(58) Field of Classification Search ..................... 15/330
 See application file for complete search history.

(56) References Cited

U.S. PATENT DOCUMENTS

| | | | |
|---|---|---|---|
| 2,024,367 A * | 12/1935 | Eriksson-Jons | ............... 15/330 |
| 4,290,165 A | 9/1981 | Hiramatsu et al. | |
| 4,451,951 A | 6/1984 | Satoh | |
| 4,694,528 A | 9/1987 | Comer et al. | |
| 4,746,274 A | 5/1988 | Kiyooka et al. | |
| 4,928,347 A | 5/1990 | Krasznai et al. | |
| 5,659,920 A | 8/1997 | Webster et al. | |
| D416,360 S | 11/1999 | Enkyo et al. | |
| 6,003,199 A | 12/1999 | Shaffer | |
| D426,354 S | 6/2000 | Ohi et al. | |
| 6,141,823 A * | 11/2000 | Fujiwara et al. | ............... 15/330 |
| 6,442,790 B1 | 9/2002 | Svoboda et al. | |
| 6,735,813 B2 * | 5/2004 | Oohama | ...................... 15/330 |

FOREIGN PATENT DOCUMENTS

GB  324972  2/1930

OTHER PUBLICATIONS

"18 Volt Pivot Vac—Model No. PHV1800" [online]. Black & Decker, Towson Maryland, 2005 [retrieved on Oct. 11, 2006]. Retrieved from the Internet:<URL:http://www.blackanddecker.com/ProductGuide/Product-Details.aspx?ProductID=14069>; 1 pg.
"Cordless 18 Volt Hand Vac" Instruction Manual. Catalog No. PHV1800, Black & Decker, Towson, Maryland, Mar. 2006; 5 pgs.

* cited by examiner

*Primary Examiner*—Bryan R Muller
(74) *Attorney, Agent, or Firm*—Mueting, Raasch & Gebhardt, P.A.

(57) ABSTRACT

A convertible blower/vacuum for selectively blowing or vacuuming debris. The blower/vacuum may include a housing to which a blower/vacuum tube is coupled. The tube may be movable, relative to the housing, to allow a primary passageway of the tube to selectively communicate with either an air inlet of the housing or an air outlet. The blower/vacuum may further include a vacuum receptacle having an opening that selectively communicates with the air outlet when the passageway of the tube communicates with the air inlet.

18 Claims, 3 Drawing Sheets

CONVERTIBLE BLOWER/VACUUM

TECHNICAL FIELD

The present invention relates generally to convertible blower/vacuums including, for example, handheld blower/vacuums having a combined blower/vacuum tube movable between a first position corresponding to a blower mode, and a second position corresponding to a vacuum mode.

BACKGROUND

Convertible blower/vacuum units (also referred to herein as "blower/vacs") are commonly used by homeowners and professionals alike for the removal of debris from yards, driveways, sidewalks, etc. As used herein, a convertible blower/vac is a portable device that is capable of being configured for use as either a blower or vacuum.

When used in the blower configuration, a generally tapered blower tube may be attached to a housing of the blower/vac. An impeller may be used to draw air into the housing through an air inlet and exhaust an accelerated air stream through an air outlet. The tapered blower tube, which is typically removably coupled to the air outlet, may provide a focused air stream of substantial velocity to sweep or blow debris.

When used as a vacuum, a removable vacuum tube may be attached to the air inlet and a bag or other debris container may attach, in place of the blower tube, to the air outlet. As a result, the blower/vac may permit leaves or similar debris to be vacuumed through the vacuum tube and collected in the container.

While more than effective for their intended purpose, conventional blower/vacs can require several separate pieces, e.g., blower tube, vacuum tube, vacuum bag, etc. to allow reconfiguration between the two operating modes. Moreover, multiple steps may be necessary to reconfigure some blower/vacs from one mode to the other.

SUMMARY

The present invention may provide a convertible blower/vac that includes: a housing defining an air inlet and an air outlet in fluid communication with one another. A powered impeller is also included and contained within the housing. A blower/vacuum tube is also provided and attached to the housing where it extends outwardly therefrom. The tube is movable, relative to the housing, between at least: a first position, wherein an elongate passageway of the tube is positioned in fluid communication with the air outlet; and a second position, wherein the elongate passageway of the tube is positioned in fluid communication with the air inlet.

In another embodiment, a blower/vacuum is provided having a housing defining an air inlet and an air outlet in fluid communication with one another. Also provided is a powered impeller contained within the housing to generate air flow between the air inlet and the air outlet. A blower/vacuum tube having a proximal end attached to the housing and a distal end is also included. The proximal end of the tube has a flange defining at least a first opening and a second opening, the first opening extending the length of the tube. The tube is coupled to the housing and movable relative thereto between at least: a first position, wherein the first opening is aligned with the air outlet and; and a second position, wherein the first opening is aligned with the air inlet.

In yet another embodiment, a blower/vacuum is provided having a housing. The housing includes a ring-shaped body with an outer surface defining an air inlet and an air outlet. A powered impeller is contained within the housing. A tube is attached to the housing and extends outwardly therefrom. The tube is movable along the outer surface of the ring-shaped body between at least: a first position, wherein a first opening of the tube is in fluid communication with the air outlet; and a second position, wherein the first opening is in fluid communication with the air inlet.

In yet another embodiment, a blower/vacuum is provided having a housing defining an air inlet and an air outlet. Also included is a powered impeller to move air from the air inlet to the air outlet, and a tube attached to the housing. The tube is movable relative to the housing without detachment therefrom, between: a first position, wherein a passageway of the tube is aligned with the air outlet; and a second position, wherein the passageway of the tube is aligned with the air inlet.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 1A-1B illustrate perspective views of a blower/vacuum, e.g., compact convertible blower/vacuum, in accordance with one embodiment of the invention, wherein: FIG. 1A illustrates the exemplary blower/vacuum configured in a blower mode, e.g., with a tube of the blower/vacuum in a first position relative to a housing of the unit; and FIG. 1B illustrates the blower/vacuum configured in a vacuum mode, e.g., with the tube in a second position; and FIGS. 2A-2B illustrate diagrammatic side cutaway views of the blower/vacuum of FIGS. 1A-1B, wherein: FIG. 2A illustrates the blower/vacuum as configured in the blower mode; and FIG. 2B illustrates the blower/vacuum as configured in the vacuum mode.

Figure 1A:
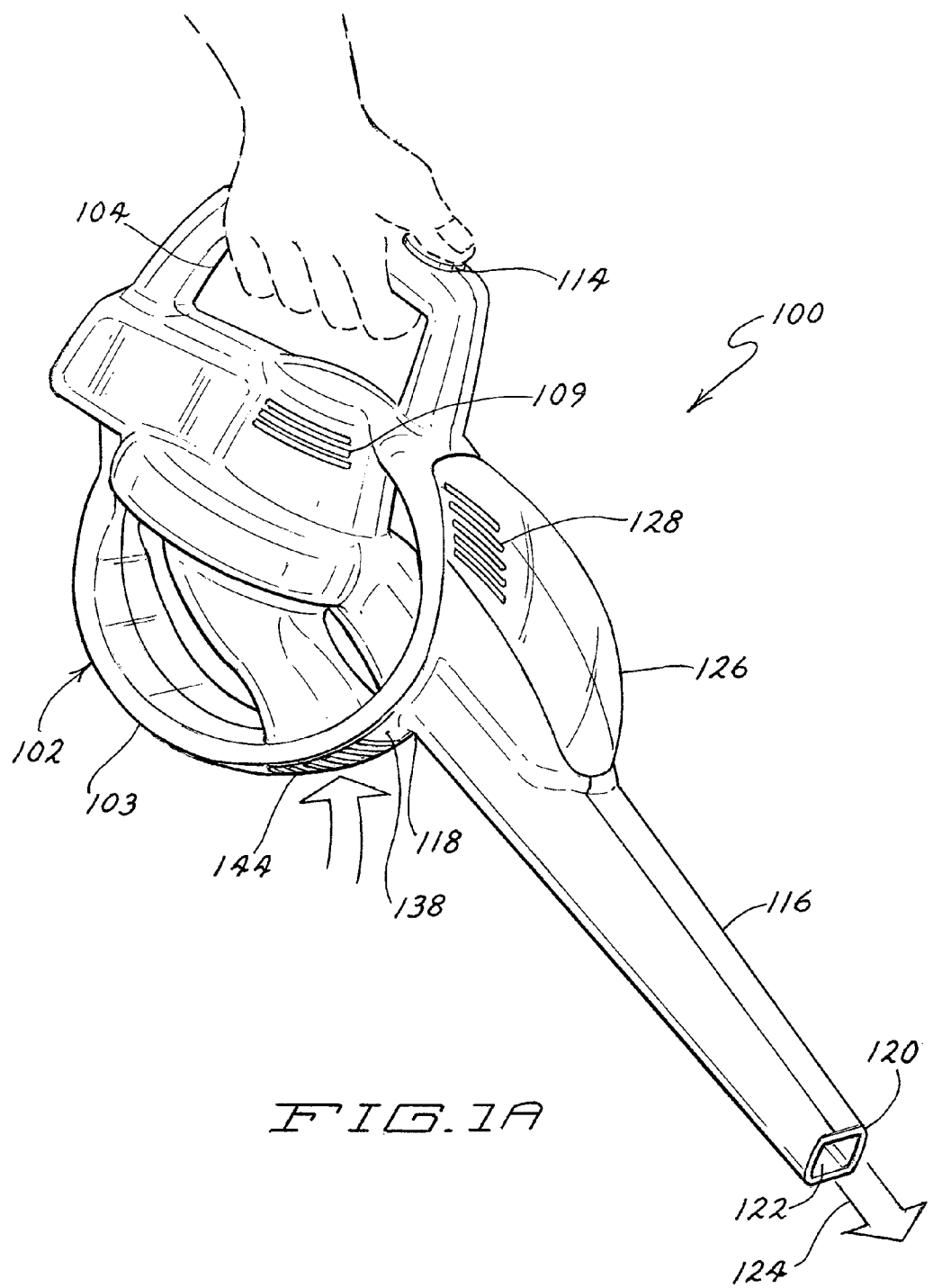

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

It is noted that the terms "comprises" and variations thereof do not have a limiting meaning where these terms appear in the accompanying description and claims. Further, "a," "an," "the," "at least one," and "one or more" are used interchangeably herein.

Relative terms such as left, right, forward, rearward, top, bottom, side, upper, lower, above, below, horizontal, vertical, and the like may be used herein and, if so, are from the perspective observed in the particular figure, or as observed when the blower/vacuum is operating (see, e.g., FIGS. 1A and 1B), unless otherwise stated herein. These terms are used only to simplify the description, however, and not to limit the scope of the invention in any way.

Figure 1B:
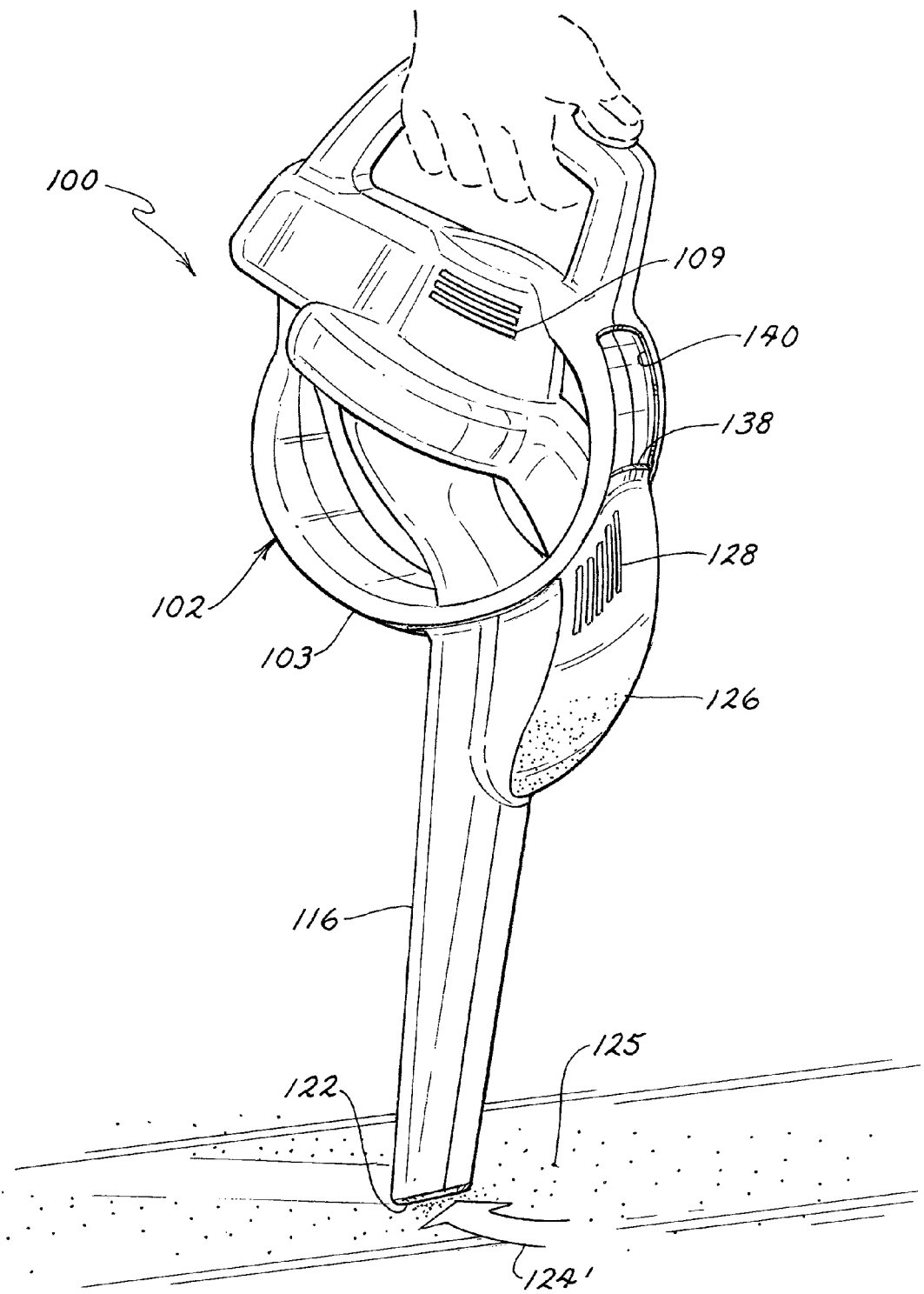
Figure 2A:
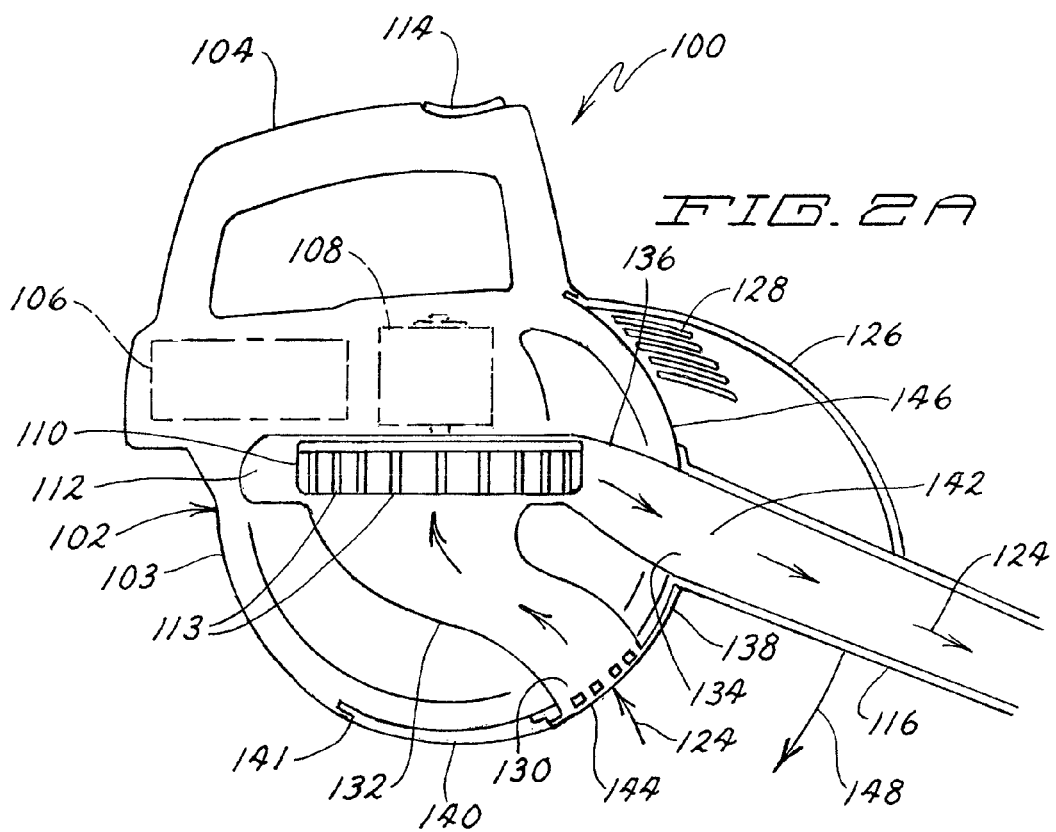
Figure 2B:
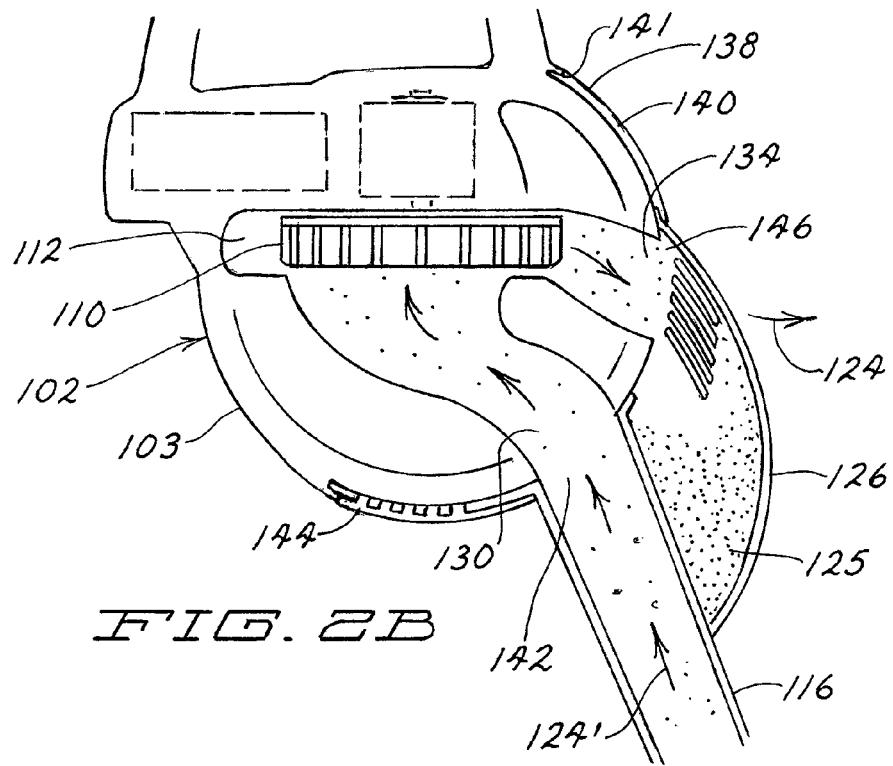

With reference to the drawings, wherein like reference numerals designate like parts and assemblies throughout the several views, FIG. 1A illustrates a perspective view of a convertible, electric blower/vacuum 100 (also referred to herein as a "blower/vac") in accordance with one exemplary embodiment of the invention. The blower/vac 100 is illustrated in a blower mode in FIG. 1A, while FIG. 1B illustrates the unit reconfigured in a vacuum mode. FIGS. 2A and 2B illustrate diagrammatic side elevation views of the blower/vac 100 in the blower mode and vacuum mode, respectively. Although embodiments of the present invention are illustrated primarily in the context of cordless (battery-powered) electric blower/vacs, those of skill in the art will appreciate that other embodiments of the present invention may include other types of blower/vacs (e.g., gas-engine powered units or corded electric units) and even other devices that utilize reversible air flow.

When configured in the blower mode as depicted in FIG. 1A, the blower/vac 100 may produce a high velocity stream of air 124 capable of sweeping debris and other materials. Conversely, when operated in the vacuum mode of FIG. 1B, the unit may draw vacuumed air 124' (air having entrained debris 125 contained therein) into a vacuum chamber or receptacle as further described below.

In the illustrated embodiment (see, e.g., FIGS. 1A and 2A), the blower/vac 100 may include a housing 102 having one or more handles 104 adapted to receive a hand or hands of an operator during use. The housing 102 may also contain a power source (e.g., a battery 106) that powers a motor (e.g., electric motor 108) enclosed within the housing. An output shaft of the motor may couple to an impeller 110 (also enclosed within the housing) that selectively rotates within a plenum 112 of the housing. The impeller may include blades 113 that, as the impeller rotates, function as a fan to move air through the housing 102. The impeller may further include secondary blades (not shown) that draw cooling air into the housing 102, e.g., via apertures or vents 109 (see FIGS. 1A and 1B), to cool the motor 108 and/or the battery 106.

To selectively control delivery of electrical power to the motor 108, a switch 114 may also be provided. The switch may be located on or near the handle 104 to allow convenient operator access. In one embodiment, the switch 114 is coupled, e.g., in series, between the battery 106 and the motor 108. The switch 114 may be configured to open or close a delivery circuit or, alternatively, to rheostatically vary power to the motor to provide adjustable air speed from the blower/vac.

The blower/vac 100 may further include a blower/vacuum conduit or tube 116 attached to the housing 102 and extending outwardly therefrom as shown in FIG. 1A. The tube 116 may include at least a first opening 142 (see FIG. 2A) that forms part of, or is otherwise fluidly coupled to, an elongate passageway defined by the tube. The tube and passageway may taper from a proximal end 118 (the end of the tube adjacent and attached to the housing 102) to a tube mouth 122 located at a distal end 120. The tapered blower/vac tube 116 may be advantageous as it accelerates and focuses the stream of air 124 produced by the blower/vac 100 when the latter is in the blower mode.

In addition to providing a conduit to deliver the high velocity stream of air while configured in blower mode, the tube 116 may also serve as a vacuum conduit or tube when the blower/vac 100 is configured in the vacuum mode (see FIGS. 1B and 2B). That is, the tube 116 may be movable, relative to the housing, from a first position where the tube functions as a blower tube/nozzle (corresponding to the blower/vac being in the blower mode), to a second position where the tube functions as a vacuum tube (corresponding to the blower/vac being in the vacuum mode).

To accommodate operation in the vacuum mode, the blower/vac 100 may include a vacuum chamber or receptacle 126. In the illustrated embodiment, the vacuum receptacle 126 may be formed as part of, or configured to attach to, a portion of the tube 116, e.g., at the proximal end 118 of the tube. For example, in the illustrated embodiment, the vacuum receptacle 126 may form a cup that attaches to the tube 116. The receptacle 126 may include one or more apertures 128 to allow the passage of air 124 out of the vacuum receptacle while restricting or limiting the passage of debris 125 entrained within the air (see FIG. 2B). As a result, debris 125 may be captured within the receptacle 126 during vacuum mode operation.

While not wishing to be bound to any particular configuration, the housing of the blower/vac 100 may, in one embodiment, include a ring-shaped (e.g., circular) body 103 as illustrated in the figures. A structure located within the annular space of the body may define the plenum 112 as well as enclose other portions of the blower/vac 100. As perhaps best shown in FIGS. 2A and 2B, an air inlet duct or conduit 132 may extend between the plenum 112 and an air inlet 130 of the housing, the latter being formed through an outer surface of the body 103. Similarly, an air outlet duct or conduit 136 may extend between the plenum 112 and an air outlet 134 of the housing, the latter also formed through the outer surface of the body 103. As a result, the air inlet and air outlet may be in fluid communication with one another so that air flow may be generated by the impeller 110 between the air inlet 130 and the air outlet 134.

While identified herein as "conduits" or "ducts" 132 and 136, such terms are not to be interpreted in a limiting fashion as most any structures that provide a generally enclosed passageway between the inlet 130 and the outlet 134 are possible without departing from the scope of the invention.

The proximal end 118 of the tube 116 may, in the illustrated embodiment, form or otherwise have attached thereto a flange 138. The flange 138 may have a shape that generally corresponds to a shape of an outer surface of the housing 102, e.g., of the body 103. As a result, the exemplary flange 138 (see, e.g., FIG. 1B), may engage one or more channels 140 formed in the body 103 of the housing 102 so that the tube 116 may move (e.g., translate), along the outer surface of the body, between the first position (FIGS. 1A and 2A) and the second position (FIGS. 1B and 2B).

In the illustrated embodiment, the ring-shaped body 103 defines a curved surface extending between the air inlet 130 and the air outlet 134. The tube 116 may translate along this curved surface. To limit or control the position of the tube relative to the housing 102, the housing may include stops 141 (see FIGS. 2A and 2B) or the like (e.g., detents, snap-fits, etc.).

In the illustrated embodiment, the tube 116 (e.g., the flange) is received and retained by the channels so that it remains attached to the housing 102 (e.g., to the channel) during the course of blower/vac operation (during vacuuming and/or blowing). That is, movement (translation) of the tube relative to the housing may occur while the two components remain coupled. However, those of skill in the art will realize that other embodiments may permit removal of the tube 116, e.g., for cleaning or tube replacement/repair.

The tube 116 (e.g., flange 138) may incorporate three distinct openings. Depending on the selected configuration of the blower/vac 100 (e.g., blower mode or vacuum mode), different combinations of these three openings may communicate, respectively, with the air inlet 130 and air outlet 134 of the housing 102. For example, the tube (e.g., flange 138) may include the first opening 142 (that corresponds to the primary elongate passageway of the tube) that, when the tube is in the first position, (blower/vac 100 is in the blower mode), aligns or is otherwise in fluid communication with the air outlet 134 (see FIG. 2A) of the housing 102. Similarly, the first opening 142/elongate passageway may, when the tube is in the second position, (blower/vac 100 is in the vacuum mode), be aligned or otherwise in fluid communication with the air inlet 130 (see FIG. 2B).

The flange may also include a second opening 144 offset from the first opening 142. The second opening 144 may form an air inlet grate that, when the tube is in the first position of FIGS. 1A and 2A, is in fluid communication or is otherwise aligned with the air inlet 130 as shown. In one embodiment, the grate may be formed by slots formed in the flange 138. The grate may permit passage of air while restricting the passage of objects into the blower/vac 100.

The flange 138 may further include a third opening 146. The third opening 146 may define an inlet to the vacuum receptacle 126 as illustrated in FIG. 2B. That is, the third opening may permit the receptacle 126 to be aligned with, or otherwise positioned in fluid communication with, the air outlet 134 when the tube 116 is in the second position (e.g., when the blower/vac is in the vacuum mode).

When the blower/vac 100 is configured in the blower mode of FIGS. 1A and 2A (e.g., when the tube 116 is in the first position), air 124 may be drawn into the plenum 112 by the impeller 110 via the air inlet 130/second opening 144, and exhausted through the air outlet 134/first opening 142, whereby the accelerated air stream 124 passes through the tube 116 and exits the tube mouth 122 (see FIG. 1A). The third opening 146 may be effectively closed or blocked by the housing 102 when the tube 116 is in the first position.

When the blower/vac 100 is reconfigured to the vacuum mode (see FIG. 2B), the first opening 142 may align or otherwise fluidly communicate with the air inlet 130 and the third opening 146 may align or otherwise fluidly communicate with the air outlet 134. In this configuration, the second opening 144 may be effectively closed or blocked by the housing 102. As a result, vacuumed air 124' with entrained debris 125 may be drawn into the housing 102, through the tube mouth 122, tube 116, and the air inlet 130 due to suction created by the impeller 110. The air and debris may then be expelled through the air outlet 134 and the third opening 146 and into the vacuum receptacle 126. As indicated above, air 124 may pass through the vacuum receptacle via the apertures 128, while most debris 125 entrained in the air is restricted by, and ultimately captured within, the receptacle 126.

While not illustrated herein, the flange 138 may include sealing members (not shown) that surround the first, second, and third openings (142, 144, and 146). The sealing members may generally form a seal between the flange and the housing 102 to minimize air leaks and ensure that air is drawn and expelled primarily via the intended openings.

The impeller blades 113 may optionally include serrations (not shown) or the like to comminute vacuumed debris 125 entrained within the vacuumed air 124'. As a result, the debris may pack more densely within the receptacle 126. The receptacle 126 may also include a snap-fit latch or the like (not shown) that permits selective detachment of the receptacle from the tube 116 when the receptacle becomes full. An interlock may optionally be provided to prevent blower/vac operation when the receptacle 126 is detached.

During operation, the blower/vac 100 may be configured in the blower mode as illustrated in FIGS. 1A and 2A. By manipulation of the switch 114, the blower/vac may cause air 124 to be inducted through the air inlet 130/second opening 144, and expelled through the air outlet 134/first opening 142/tube 116. As a result, a fast moving stream of air 124 exits the mouth 122 of the tube 116 as shown by the flow direction arrows in FIGS. 1A and 2A. By then positioning the distal end 120 of the tube 116, the operator may direct the sweeping stream of air 124 across a surface (e.g., driveway, walkway, etc.) to clear debris.

Should the operator decide to collect (vacuum) debris, the blower/vac 100 may be quickly reconfigured to the vacuum mode of FIGS. 1B and 2B. To reconfigure the blower/vac, the operator may simply impart a force to the tube 116 in the direction 148 (see FIG. 2A) relative to the body 102. Once a threshold force is reached, the tube (e.g., the flange 138) may translate along the channel 140. Sufficient translation may result in reconfiguration of the blower/vac 100 to the vacuum mode of FIGS. 1B and 2B. Once again, stops 141 may be provided to limit the movement of the tube 116 relative to the body 102. Other features, e.g., detents, friction, etc., may be used to maintain the tube in the desired position.

In the vacuum mode, manipulation of the switch 114 may cause the blower/vac 100 to draw vacuumed air 124' and entrained debris 125 through the tube 116/first opening 142/air inlet 130, and expel the air through the air outlet 134/third opening 146 as represented by the arrows in FIG. 2B. As a result, vacuumed air 124' and entrained debris 125 are drawn through the mouth 122 and the housing 102 and into the receptacle 126, where air 124 may be exhausted through the ducts 128 while debris 125 is trapped within the receptacle. Thus, by positioning the distal end 120 of the tube 116 proximate a surface to be cleaned as shown in FIG. 1B, the blower/vac 100 may vacuum and collect debris. At the completion of vacuuming, the operator may remove the vacuum receptacle 126 from the blower/vac 100 and dispose of the debris.

Embodiments of the present invention may thus provide a blower/vacuum reconfigurable between blower and vacuum modes by repositioning of the blower/vacuum tube 116 while the latter remains attached to the housing 102. The blower/vac may be reconfigured, in one embodiment, by translating the tube 116 relative to the housing 102. However, other relative motions, e.g., pivoting, may also be possible without departing from the scope of the invention. Accordingly, in some embodiments, the same tube 116 (e.g., the same passageway within the tube) may be utilized for both blowing and vacuuming. Embodiments of the present invention may further incorporate the vacuum receptacle on the housing, e.g., on the tube 116, such that the vacuum receptacle is attached at most all times, e.g., during operation in both blower and vacuum modes.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:
1. A blower/vacuum comprising:
  a housing defining an air inlet and an air outlet in fluid communication with one another, wherein the housing comprises an outer curved surface upon which are located both the air inlet and the air outlet;

a powered impeller contained within the housing;
a blower/vacuum tube attached to the housing and extending outwardly therefrom; and
a vacuum receptacle selectively attachable to the tube, wherein the vacuum receptacle and the tube are, when the vacuum receptacle is attached to the tube, movable, relative to the housing, between at least: a first position, wherein an elongate passageway of the tube is positioned in fluid communication with the air outlet; and a second position, wherein the elongate passageway of the tube is positioned in fluid communication with the air inlet.

2. The blower/vacuum of claim 1, wherein the vacuum receptacle is positioned in fluid communication with the air outlet when the tube is in the second position.

3. The blower/vacuum of claim 1, further comprising an air inlet grate attached to the tube and positioned over the air inlet when the tube is in the first position.

4. The blower/vacuum of claim 1, wherein the tube is translatable along the curved surface of the housing between the first and second positions.

5. The blower/vacuum of claim 1, wherein the housing defines a channel to receive and retain a flange located at a proximal end of the tube.

6. The blower/vacuum of claim 1, further comprising an electric motor associated with the housing.

7. The blower/vacuum of claim 1, further comprising a battery associated with the housing.

8. A blower/vacuum comprising:
a housing defining an air inlet and an air outlet in fluid communication with one another, wherein the housing comprises an outer curved surface upon which are located both the air inlet and the air outlet;
a powered impeller contained within the housing to generate air flow between the air inlet and the air outlet;
a blower/vacuum tube comprising a proximal end attached to the housing and a distal end, the proximal end of the tube comprising a flange defining at least a first opening and a second opening, the first opening extending the length of the tube, wherein the tube is coupled to the housing; and
a vacuum receptacle attached to the tube,
wherein the tube and vacuum receptacle are movable relative to the housing between at least: a first position, wherein the first opening is aligned with the air outlet and the second opening is aligned with the air inlet; and a second position, wherein the first opening is aligned with the air inlet.

9. The blower/vacuum of claim 8, wherein the flange further defines a third opening defining an inlet to the vacuum receptacle, the third opening aligned with the air outlet when the tube and vacuum receptacle are in the second position.

10. The blower/vacuum of claim 8, wherein the vacuum receptacle is selectively detachable from the tube.

11. The blower/vacuum of claim 8, wherein the housing further defines channels in which the flange may translate.

12. A blower/vacuum comprising:
a housing comprising:
a ring-shaped body comprising an outer curved surface upon which are located both an air inlet and an air outlet; and
a powered impeller contained within the housing; and
a tube attached to the housing and extending outwardly therefrom, the tube movable along the outer surface of the ring-shaped body between at least: a first position, wherein a first opening of the tube is in fluid communication with the air outlet and a second opening of the tube, offset from the first opening, is in fluid communication with the air inlet; and a second position, wherein the first opening is in fluid communication with the air inlet and the second opening is closed or blocked by the housing.

13. The blower/vacuum of claim 12, wherein the tube further comprises a flange, the flange defining the second opening.

14. The blower/vacuum of claim 12, further comprising:
a structure located within an annular space defined by the ring-shaped body, the structure defining a plenum;
an air inlet duct extending from the plenum to the air inlet; and
an air outlet duct extending from the plenum to the air outlet.

15. The blower/vacuum of claim 12, further comprising a vacuum receptacle attached to the tube, the receptacle movable, together with the tube, along the outer surface of the ring-shaped body, wherein the receptacle is positioned in fluid communication with the air outlet when the tube is in the second position.

16. A blower/vacuum comprising:
a housing defining an air inlet and an air outlet;
a powered impeller to move air from the air inlet to the air outlet; and
a tube attached to the housing, the tube movable relative to the housing without detachment therefrom, between: a first position, wherein a passageway of the tube is aligned with the air outlet; and a second position, wherein the passageway of the tube is aligned with the air inlet, the tube comprising a flange located at a proximal end of the tube, the flange forming an air inlet grate aligned with the air inlet when the tube is in the first position, wherein the housing defines a channel to receive and retain the flange.

17. The blower/vacuum of claim 16, wherein the tube further comprises a vacuum receptacle aligned with the air outlet when the tube is in the second position.

18. The blower/vacuum of claim 16, wherein the air inlet grate is blocked by the housing when the tube is in the second position.

* * * * *